(12) United States Patent
Potluri et al.

(10) Patent No.: US 12,219,448 B2
(45) Date of Patent: Feb. 4, 2025

(54) METHOD AND SYSTEM FOR DISCOVERY OF NETWORK ANALYTICS

(71) Applicant: Verizon Patent and Licensing Inc., Basking Ridge, NJ (US)

(72) Inventors: Ravi Potluri, Coppell, TX (US); Sudhakar Reddy Patil, Flower Mound, TX (US); Kristen Sydney Young, Mine Hill, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 358 days.

(21) Appl. No.: 17/669,589

(22) Filed: Feb. 11, 2022

(65) Prior Publication Data

US 2023/0262433 A1 Aug. 17, 2023

(51) Int. Cl.
*H04W 4/50* (2018.01)
*H04W 4/20* (2018.01)
*H04W 48/16* (2009.01)
*H04W 60/04* (2009.01)

(52) U.S. Cl.
CPC .............. *H04W 4/50* (2018.02); *H04W 4/20* (2013.01); *H04W 48/16* (2013.01); *H04W 60/04* (2013.01)

(58) Field of Classification Search
None
See application file for complete search history.

(56) References Cited

U.S. PATENT DOCUMENTS

| | | | |
|---|---|---|---|
| 2020/0110600 A1* | 4/2020 | Weldemariam | G06N 3/04 |
| 2021/0176233 A1* | 6/2021 | Starov | H04L 63/1441 |
| 2022/0108214 A1* | 4/2022 | Lee | G06N 20/20 |
| 2022/0292239 A1* | 9/2022 | Kahraman | G06N 20/00 |
| 2022/0337487 A1* | 10/2022 | Wei | H04L 41/145 |
| 2023/0196367 A1* | 6/2023 | Zhuge | G06Q 20/382 |
| | | | 705/39 |
| 2023/0388389 A1* | 11/2023 | Xin | H04L 67/51 |

OTHER PUBLICATIONS

ETSI TS 123 288 V16.5.0 (Oct. 2020): Technical Specification: 5G; Architecture enhancements for 5G System (5GS) to support network data analytics services (3GPP TS 23.288 version 16.5.0 Release 16). 68 pages.

* cited by examiner

*Primary Examiner* — Kenneth B Wells

(57) ABSTRACT

A method, a device, and a non-transitory storage medium are described in which a network analytics model service is provided. The service may include ingesting customized models and non-customized models by a network analytics device. The ingestion procedure may include receiving the model and model specification data. The service may include provisioning the model and registering the model for discovery by other network devices. The service may include specifying customized identifiers to be used prospective subscribing network devices for the analytics information. The service may also facilitate the use of the analytics information by the subscribing network devices.

20 Claims, 8 Drawing Sheets

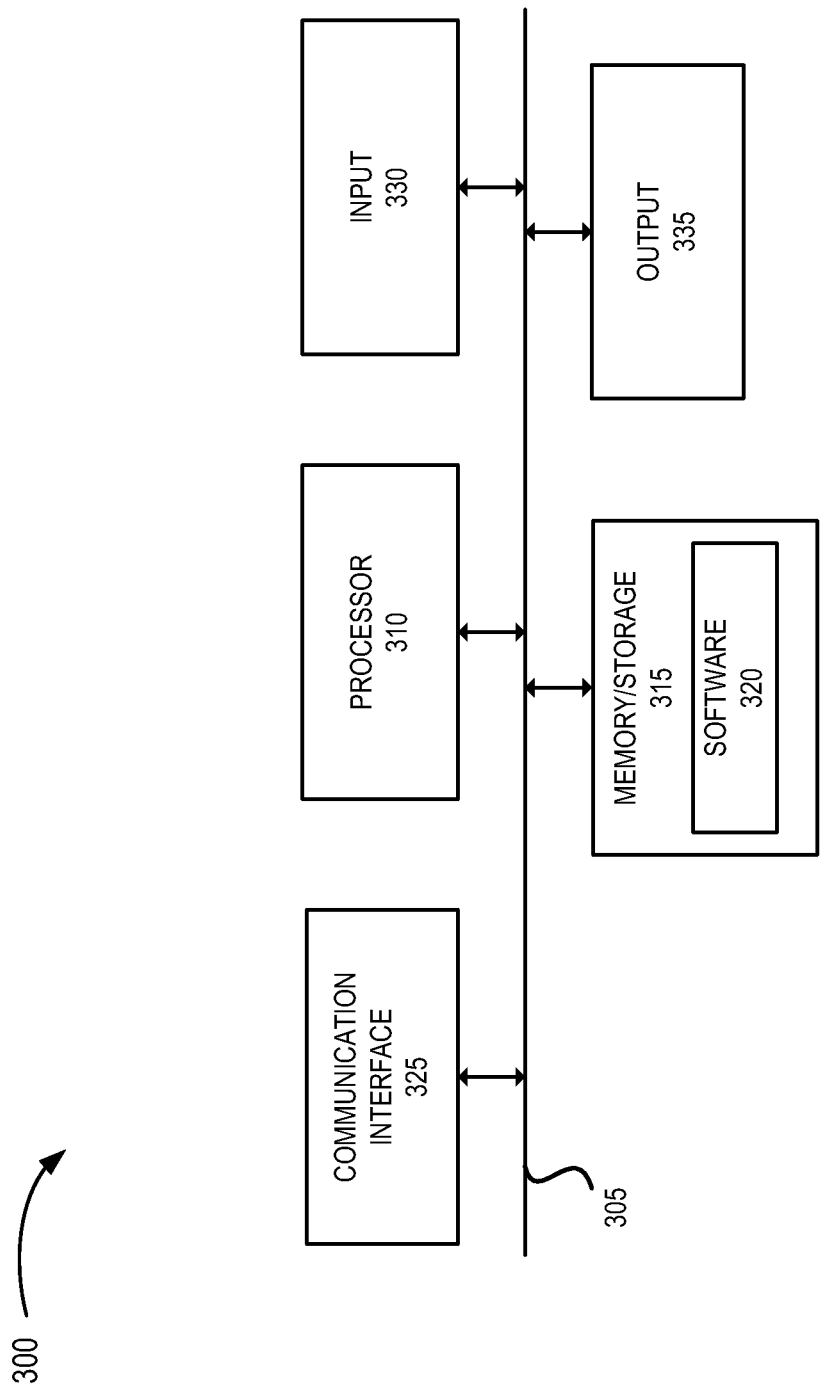

METHOD AND SYSTEM FOR DISCOVERY OF NETWORK ANALYTICS

BACKGROUND

Development and design of networks present certain challenges from a network-side perspective and an end device perspective. For example, Next Generation (NG) wireless networks, such as Fifth Generation New Radio (5G NR) networks are being deployed and under development.

BRIEF DESCRIPTION OF THE DRAWINGS

FIG. 3 is a diagram illustrating exemplary components of a device that may correspond to one or more of the devices illustrated and described herein.

DETAILED DESCRIPTION

Figure 1:
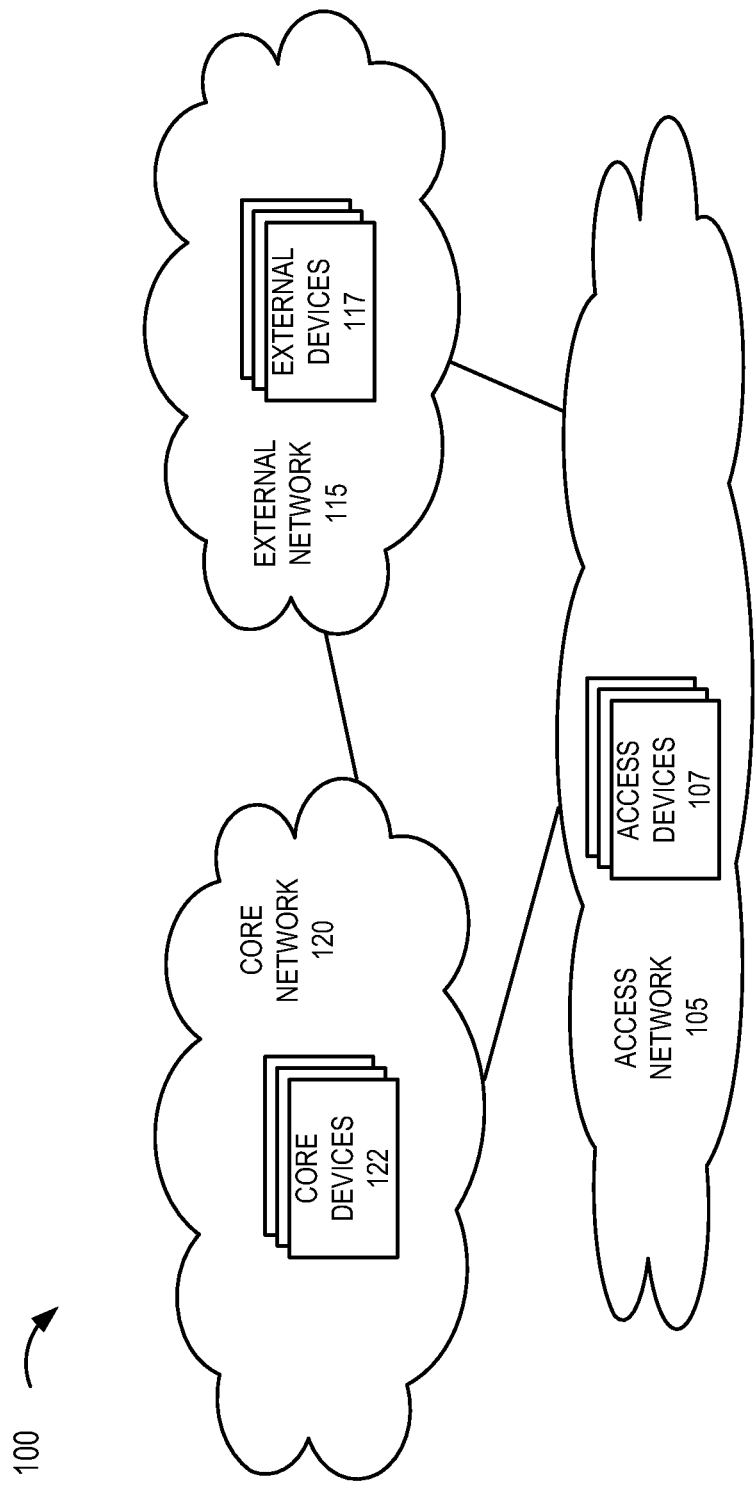
FIG. 1 is a diagram illustrating an exemplary environment in which an exemplary embodiment of a network analytics model service may be implemented.

The following detailed description refers to the accompanying drawings. The same reference numbers in different drawings may identify the same or similar elements. Also, the following detailed description does not limit the invention.

A core network, such as a Fifth Generation (5G) core network or another generation type of network (e.g., 5.5G, Sixth Generation (6G), Fourth Generation (4G), etc.), may include a network data analytics function (NWDAF). Generally, the NWDAF may collect data from various sources, process the data, and generate and distribute analytics to subscribed network devices of the NWDAF service (also referred to as consumers of a producer-consumer model). Depending on the type of analytics data (e.g., slice load level information, network performance information, UE mobility information, etc.), each type of analytics data may be identified by a different analytics identifier. Various standards bodies, such as Third Generation Partnership Project (3GPP), 3GPP2, International Telecommunication Union (ITU), European Telecommunications Standards Institute (ETSI), Global System Mobile Association (GSMA), and the like, define the scope of the analytics generation and the scope of analytics usage by the subscribed network devices, such as consumer network functions and management network elements. This approach is, however, limiting to the configuration of the NWDAF and the configuration of subscribed network devices and their ability to manage network operations, network policies, and/or network configurations based on tailored or customized management logic. As such, a more flexible approach to analytics generation and usage would be beneficial and enable a versatile management of network operations based on analytics-based decision-making. Further, network standards do not specify any procedures for creating and provisioning analytic models for the NWDAF.

According to exemplary embodiments, a network analytics model service is described. According to an exemplary embodiment, the network analytics model service may include an ingestion service and a provisioning service, as described herein. For example, the ingestion service may include receiving a customized model (e.g., artificial intelligence (AI) logic, machine learning (ML) logic, or the like) according to a NWDAF model data specification (NMDS). The NMDS may define, among other things, the input data and the output data of the model. The NMDS may provide for a format for custom analytics identifiers and may provide other parameters that relate to the customized model and/or the customized analytics information, as described herein. The ingestion service may also include a training service that may provide for training of the customized model. According to an exemplary embodiment, the network analytics model service may include provisioning the NWDAF with the model and allowing subscription to the customized analytics by other network devices, as described herein.

In view of the foregoing, the network analytics model service may provide the ability to create, add, and distribute customized models (in addition to non-customized models) in an analytics network device, such as the NWDAF. For example, the customized models may generate analytics information that is beyond that defined by current network standards (e.g., 3GPP, 3GPP2, ITU, etc.). For example, the customized analytics information may not relate to slice load information, observed service experience information, network function load information, network performance information, UE mobility information, UE communication information, expected UE behavioral parameters, UE abnormal behavior information, user data congestion information, and quality of service (QoS) sustainability. According to various exemplary embodiments, a customized model and customized analytics information may be network device specific (e.g., an access and mobility management function (AMF) or another type of consumer network device), network operation specific (e.g., handover, attachment, session establishment, or the like), network slice specific (e.g., S-NSSAI, etc.), and/or another configurable criterion or criteria (e.g., customized instances of data and/or parameters for input). A customized model and customized analytics information may be specific to a network operator or deployment, for example.

According to an exemplary embodiment, the customized analytics information may be tailored to the analytic needs of network devices in a network and their associated functions and/or operations. The network analytics model service may also provide the NMDS that may enable interpretation of the model in the NWDAF. Network devices may subscribe to customized analytics information based on custom analytics identifiers, as described herein. Accordingly, the network analytics model service may enable a flexible and improved approach to generate and use analytics information that may support the operation of various network devices of a network.

FIG. 1 is a diagram illustrating an exemplary environment 100 in which an exemplary embodiment of network analytics model service may be implemented. As illustrated, environment 100 includes an access network 105, an external network 115, and a core network 120. Access network 105 includes access devices 107 (also referred to individually or generally as access device 107). External network 115 includes external devices 117 (also referred to individually or generally as external device 117). Core network 120 includes core devices 122 (also referred to individually or generally as core device 122).

The number, type, and arrangement of networks illustrated in environment 100 are exemplary. For example, according to other exemplary embodiments, environment 100 may include fewer networks, additional networks, and/ or different networks. For example, according to other exemplary embodiments, other networks not illustrated in FIG. 1 may be included, such as an X-haul network (e.g., backhaul, mid-haul, fronthaul, etc.), a transport network (e.g., Signaling System No. 7 (SS7), etc.), or another type of network that may support a wireless service and/or an application service, as described herein.

A network device, a network element, or a network function (referred to herein simply as a network device) may be implemented according to one or multiple network architectures, such as a client device, a server device, a peer device, a proxy device, a cloud device, and/or a virtualized network device. Additionally, a network device may be implemented according to various computing architectures, such as centralized, distributed, cloud (e.g., elastic, public, private, etc.), edge, fog, and/or another type of computing architecture, and may be incorporated into distinct types of network architectures (e.g., Software Defined Networking (SDN), virtual, logical, network slice, etc.). The number, the type, and the arrangement of network devices are exemplary.

Environment 100 includes communication links between the networks and between the network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication. A message communicated in support of the network analytics model service may use at least one of these planes of communication. Additionally, an interface of a network device may be modified (e.g., relative to an interface defined by a standards body, such as 3GPP, 3GPP2, ITU, ETSI, GSMA, and the like) or a new interface of the network device may be provided in order to support the communication (e.g., transmission and reception of messages, an information element (IE), an attribute value pair (AVP), an object, a parameter, or another form of a data instance) between network devices and the network analytics model service logic of the network device. According to various exemplary implementations, the interface of the network device may be a service-based interface, a reference point-based interface, an Open Radio Access Network (O-RAN) interface, a 5G interface, another generation of interface (e.g., 5.5G, 6G, Seventh Generation (7G), etc.), or some other type of network interface.

Access network 105 may include one or multiple networks of one or multiple types and technologies. For example, access network 105 may be implemented to include a 5G RAN, a future generation RAN (e.g., a 6G RAN, a 7G RAN, or a subsequent generation RAN), a centralized-RAN (C-RAN), and/or another type of access network. Access network 105 may include a legacy RAN (e.g., a Third Generation (3G) RAN, a 4G or 4.5 RAN, etc.). Depending on the implementation, access network 105 may include one or multiple types of network devices, such as access devices 107. For example, access device 107 may include a next generation Node B (gNB), an evolved LTE (eLTE) evolved Node B (eNB), an eNB, a radio network controller (RNC), a remote radio head (RRH), a baseband unit (BBU), a radio unit (RU), a centralized unit (CU), a CU control plane (CU CP), a CU user plane (CU UP), a distributed unit (DU), a small cell node (e.g., a picocell device, a femtocell device, a microcell device, a home eNB, etc.), an open network device (e.g., O-RAN Centralized Unit (O-CU), O-RAN Distributed Unit (O-DU), O-RAN next generation Node B (O-gNB), O-RAN evolved Node B (O-eNB)), a 5G ultra-wide band (UWB) node, a future generation wireless access device (e.g., a 6G wireless station, a 7G wireless station, or another generation of wireless station), another type of wireless node (e.g., a WiFi device, a WiMax device, a hotspot device, etc.) that provides a wireless access service.

External network 115 may include one or multiple networks of one or multiple types and technologies that provides an application service. For example, external network 115 may be implemented using one or multiple technologies including, for example, network function virtualization (NFV), SDN, cloud computing, Infrastructure-as-a-Service (IaaS), Platform-as-a-Service (PaaS), Software-as-a-Service (SaaS), or another type of network technology. External network 115 may be implemented to include a cloud network, a private network, a public network, a MEC network, a fog network, the Internet, a packet data network (PDN), a service provider network, the World Wide Web (WWW), an Internet Protocol Multimedia Subsystem (IMS) network, a Rich Communication Service (RCS) network, an SD network, a virtual network, a packet-switched network, a data center, or other type of network that may provide access to and may host an end device application service.

Depending on the implementation, external network 115 may include various network devices such as external devices 117. For example, external devices 117 may include virtual network devices (e.g., virtualized network functions (VNFs), servers, host devices, containers, hypervisors, virtual machines (VMs), network function virtualization infrastructure (NFVI), and/or other types of virtualization elements, layers, hardware resources, operating systems, engines, etc.) that may be associated with application services for use by end devices (not illustrated). By way of further example, external devices 117 may include mass storage devices, data center devices, NFV devices, SDN devices, cloud computing devices, platforms, and other types of network devices pertaining to various network-related functions (e.g., security, management, charging, billing, authentication, authorization, policy enforcement, development, etc.). External network 115 may include one or multiple types of core devices 122, as described herein.

External devices 117 may host one or multiple types of application services.

Core network 120 may include one or multiple networks of one or multiple network types and technologies. Core network 120 may include a complementary network of access network 105. For example, core network 120 may be implemented to include a 5G core network, an EPC of an LTE network, an LTE-Advanced (LTE-A) network, and/or an LTE-A Pro network, a future generation core network (e.g., a 5.5G, a 6G, a 7G, or another generation of core network), and/or another type of core network.

Depending on the implementation of core network 120, core network 120 may include diverse types of network devices that are illustrated in FIG. 1 as core devices 122. For example, core devices 122 may include a user plane function (UPF), a Non-3GPP Interworking Function (N3IWF), an AMF, a session management function (SMF), a unified data management (UDM) device, a unified data repository (UDR), an authentication server function (AUSF), a network slice selection function (NSSF), a network repository function (NRF), a policy control function (PCF), a binding support function (BSF), an NWDAF, a network exposure function (NEF), an SCEF, a lifecycle management (LCM) device, an application function (AF), a mobility management entity (MME), a packet gateway (PGW), an enhanced packet data gateway (ePDG), a serving gateway (SGW), an application function (AF), a home agent (HA), a General Packet Radio Service (GPRS) support node (GGSN), a home subscriber server (HSS), an authentication, authorization, and accounting (AAA) server, a policy and charging rules function (PCRF), a policy and charging enforcement function (PCEF), and/or a charging system (CS).

According to other exemplary implementations, core devices 122 may include additional, different, and/or fewer network devices than those described. For example, core devices 122 may include a non-standard or a proprietary network device, and/or another type of network device that may be well-known but not particularly mentioned herein. Core devices 122 may also include a network device that provides a multi-RAT functionality (e.g., 4G and 5G, 5G and 5.5G, 5G and 6G, etc.), such as an SMF with PGW control plane functionality (e.g., SMF+PGW–C), a UPF with PGW user plane functionality (e.g., UPF+PGW–U), and/or other combined nodes (e.g., an HSS with a UDM and/or UDR, an MME with an AMF, etc.). Also, core devices 122 may include a split core device 122. For example, core devices 122 may include a session management (SM) PCF, an access management (AM) PCF, a user equipment (UE) PCF, and/or another type of split architecture associated with another core device 122, as described herein.

According to an exemplary embodiment, core device 122, such as an NWDAF, may include logic that provides the network analytics model service, as described herein. According to an exemplary embodiment, various core devices 122 in core network 120, such as an AMF, an SMF, a PCF, an NSSF, a NEF, an AF, or another type of core device 122 may include logic to subscribe to the network analytics model service and may use customized analytics information to perform network operations and functions. Additionally, according to an exemplary embodiment, various access devices 107 of access network 105 and/or external devices 117 of external network 115 may include logic to subscribe to the network analytics model service and may use customized analytics information to perform network operations and functions.

Figure 2A:
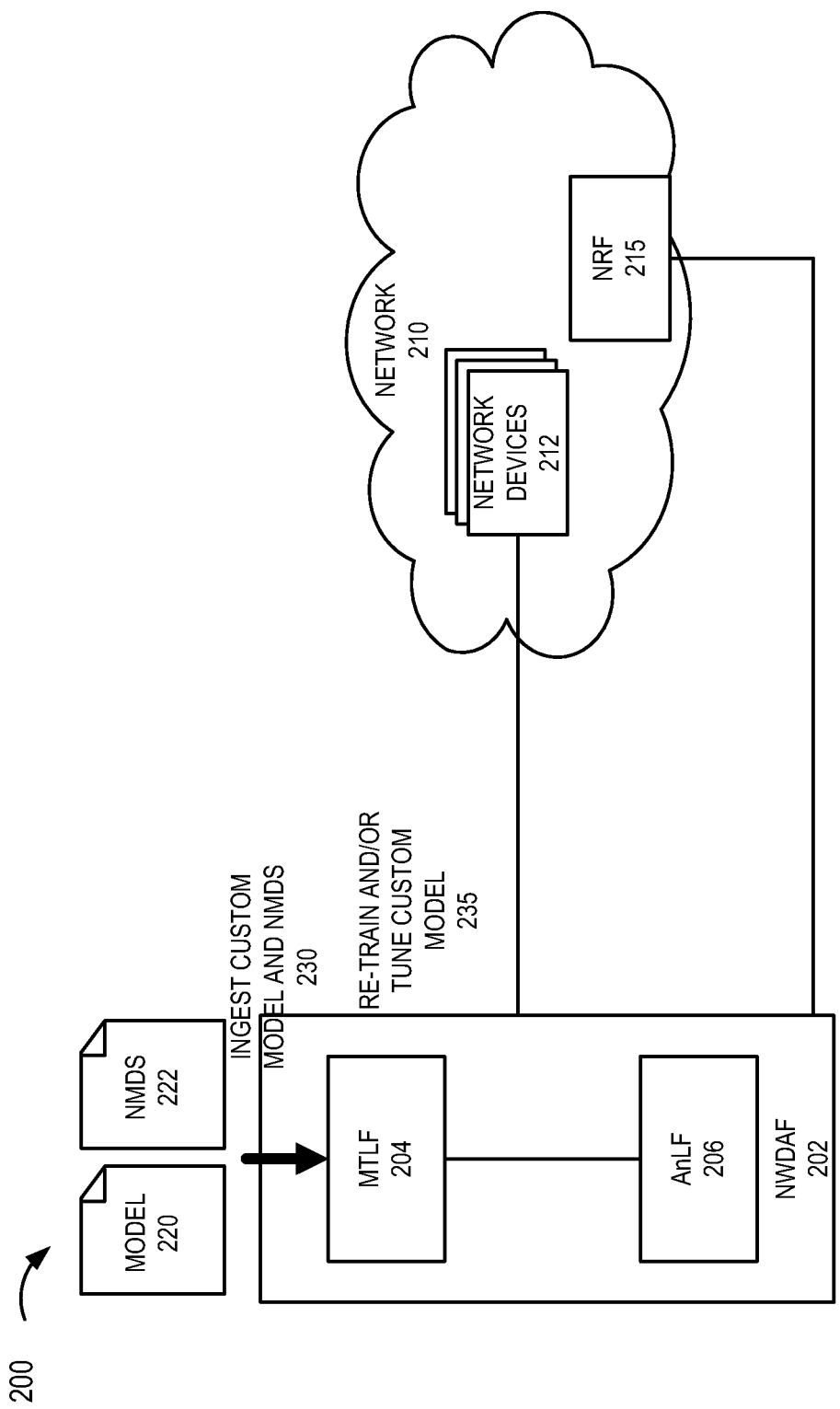
FIGS. 2A-2E are diagrams illustrating an exemplary process of an exemplary embodiment of the network analytics model service.

FIGS. 2A-2E are diagrams illustrating an exemplary process 200 of an exemplary embodiment of the network analytics model service. Process 200 may be performed in an exemplary environment that includes environment 100. For example, as illustrated in FIG. 2A, the environment may include an NWDAF 202 and a network 210. Network 210 may include access network 105, external network 115, and/or core network 120. Network devices 212 may include access devices 107, external devices 117, core devices 122, an operation, administration, and maintenance (OAM) device, and/or another type of network device not specifically described herein.

NWDAF 202 may include a network device that may provide functions and/or services specified by a standards entity (e.g., 3GPP, etc.) and/or of a proprietary nature. Additionally, NWDAF 202 may include logic that provides the network analytics model service, as described herein. According to an exemplary embodiment, NWDAF 202 may include a model training logic function (MTLF) 204 and an analytics logic function (AnLF) 206. According to other exemplary embodiments, NWDAF 202 may include additional, different, and/or fewer components. For example, NWDAF 202 may include a data collection coordination function (DCCF), an analytics data repository function (ADRF), a messaging framework adaptor function (MFAF), and/or another type of component that may facilitate data collection, analytic, and/or subscription services.

MTLF 204 may include logic that may train models (e.g., AI models, ML models, learning-based and/or device intelligence logic, custom models, non-custom models) and may expose training services. MTLF 204 may include logic that provides an operation or a function of the network analytics model service, as described herein.

AnLF 206 may include logic that may perform inference, may derive analytics information, and may expose an analytics service. AnLF 206 may include logic that provides an operation or a function of the network analytics model service, as described herein.

NRF 215 may include a network device that may store information about network devices 212 for use by NWDAF 202. NRF 215 may also store analytics identifiers supported by NWDAF 202. According to an exemplary embodiment, NRF 215 may store customized analytics identifiers relating to customized analytics information, as described herein. NRF 215 may store other types of descriptive information pertaining to a customized model and/or associated customized analytics information. NRF 215 may support discovery by network devices 212 of corresponding analytics information associated with customized and non-customized analytic identifiers of NWDAF 202.

Referring to FIG. 2A, according to an exemplary scenario, a model 220 and an NMDS 222 may be ingested 230 by MTLF 204. For example, model 220 may include customized AI and/or ML logic that provides or generates customized analytic information. For example, according to an exemplary scenario, model 220 may provide a list of fixed wireless devices that are operating outside of their expected cell. In this way, for example, an OAM tool may be used to identify fixed wireless access (FWA) devices that are operating outside expected service areas. Additionally, model 220 may be configured to analyze data specific to a network slice, such as an FWA slice, for example. According to other exemplary scenarios, model 220 may relate to another type of customized model and associated customized analytics information.

As further illustrated, NMDS 222 may include data pertaining to the customized model and the customized analytics information. For example, NMDS 222 may indicate a customized analytics identifier and data pertaining to the input data of the customized model (e.g., data elements required and/or other types of parameters). For example, the input data may include event identifiers, OAM data, and/or other types of data. The input data may include an analytics identifier (e.g., customized and/or non-customized identifier(s) associated with customized and/or non-customized analytics information of another model). NMDS 222 may indicate whether training is required or not (e.g., by MTLF 204), output data sizes (e.g., min/max volumes of a single instance of output), an output data frequency option (e.g., frequency options for output customization), applications using the output (e.g., which application may be likely consumers of this model), network slice relevance (e.g., slice service type/slice differentiator (SST/SD) of a network slice that may be relevant to the model), current version of the model, consumer of relevance to the model (e.g., specify one or multiple types of network devices of relevance to the model), network operation of relevance to the model, and/or other data that may pertain to the input, the output, the consumer, and/or use. According to some exemplary implementations, NMDS 222 may be provided by a model provider. As previously mentioned, NMDS 222 may provide a standardized way of enabling interpretation of model 220 by NWDAF 202. NMDS 222 may also enable MTLF 204, AnLF 206, and potentially other functional components of NWDAF 202 not specifically illustrated (e.g., DCCF, ADRF, MFAF, and/or another component) to map the input data and/or the output data. For example, MTLF 204 may map the input data to a specific messaging framework adaptor and/or storage repository function(s).

As a part of the ingestion process, MTLF 204 may read or analyze NMDS 222 and determine whether training is required or requested. According to this exemplary scenario, assume that NMDS 222 may indicate that re-training and/or tuning of model 220 with operator network data is requested. As such, MTLF 204 may re-train and/or tune custom model 235. According to other exemplary scenarios, this may not be the case. MTLF 204 may use existing DCCF's existing methods to collect data for training or tuning purposes.

Figure 2B:
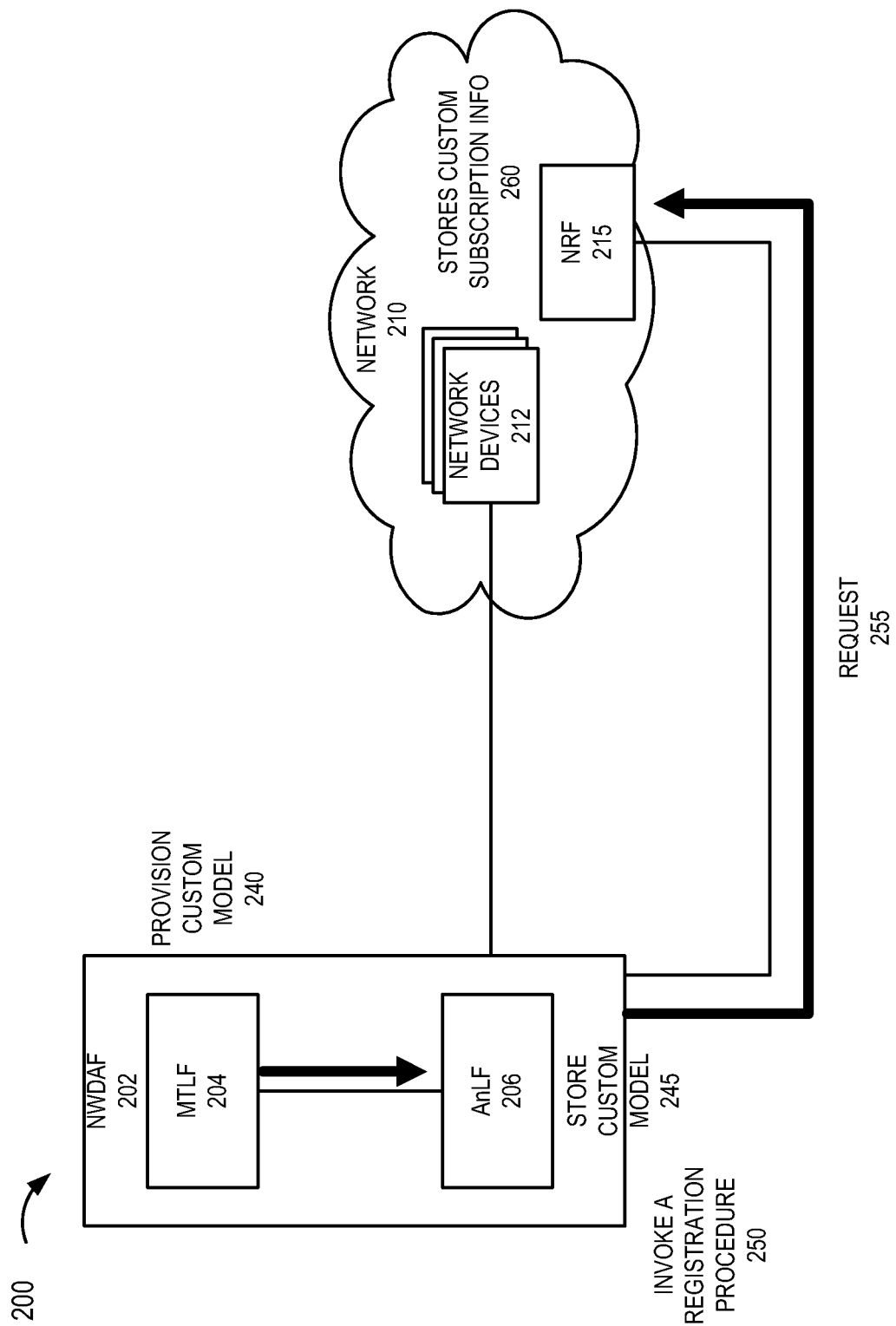

Referring to FIG. 2B, according to an exemplary embodiment, in response to completion of the ingestion process, MTLF 204 may provision 240 the custom model with AnLF 206 and AnLF 206 may store 245 the custom model. For example, MTLF 204 may determine that model 220 is a new model being on-boarded (e.g., initially provisioned) and may provision model 220 with AnLF 206 before a request for model 220 may be received by NWDAF 202 from a consumer network device. According to an exemplary embodiment, AnLF 206 may be configured to recognize an analytics identifier as a custom analytics identifier based on its format, as described herein. As further illustrated, AnLF 206 may invoke a registration procedure 250 in response to the provisioning. For example, AnLF 206 may determine that model 220 is provisioned without receiving a request for a subscription to the custom analytics information from a consumer network device. According to an exemplary embodiment, AnLF 206 may generate and transmit a request 255 to NRF 215 (or another suitable repository network device), as a part of a registration procedure, for the newly onboarded model 220. As a result of the registration procedure, NRF 215 may store 260 custom subscription information relating to model 220. The custom subscription information may enable a prospective consumer network device to subscribe to the custom analytics information with NWDAF 202.

According to an exemplary embodiment, the custom analytics information includes the custom analytics identifier relating to model 220 and/or associated custom analytics information. According to an exemplary embodiment, the custom analytics identifier may comport with a length standard of a network standard for an analytics identifier. According to an exemplary embodiment, the custom analytics identifier may include data indicating that the analytics identifier relates to a customized model. For example, the custom analytics identifier may include one or more characters (e.g., C, CUST, etc.) to indicate a custom analytics identifier. Additionally, for example, the custom analytics identifier may include characters that may be unique among other custom analytics identifiers. For example, the custom analytics identifier may include an operator-defined string that may occupy the remaining characters of the entire string of the custom analytics identifier (e.g., CUST12345678, C12345678901, etc.). According to other exemplary embodiments, other formats for the custom analytics identifier may be implemented, such as not including data indicating that the analytics identifier relates to a customized model. The registered custom subscription information may include other parameters associated with model 220 and/or the customized analytics information (e.g., variable output parameters, etc.).

Figure 2C:
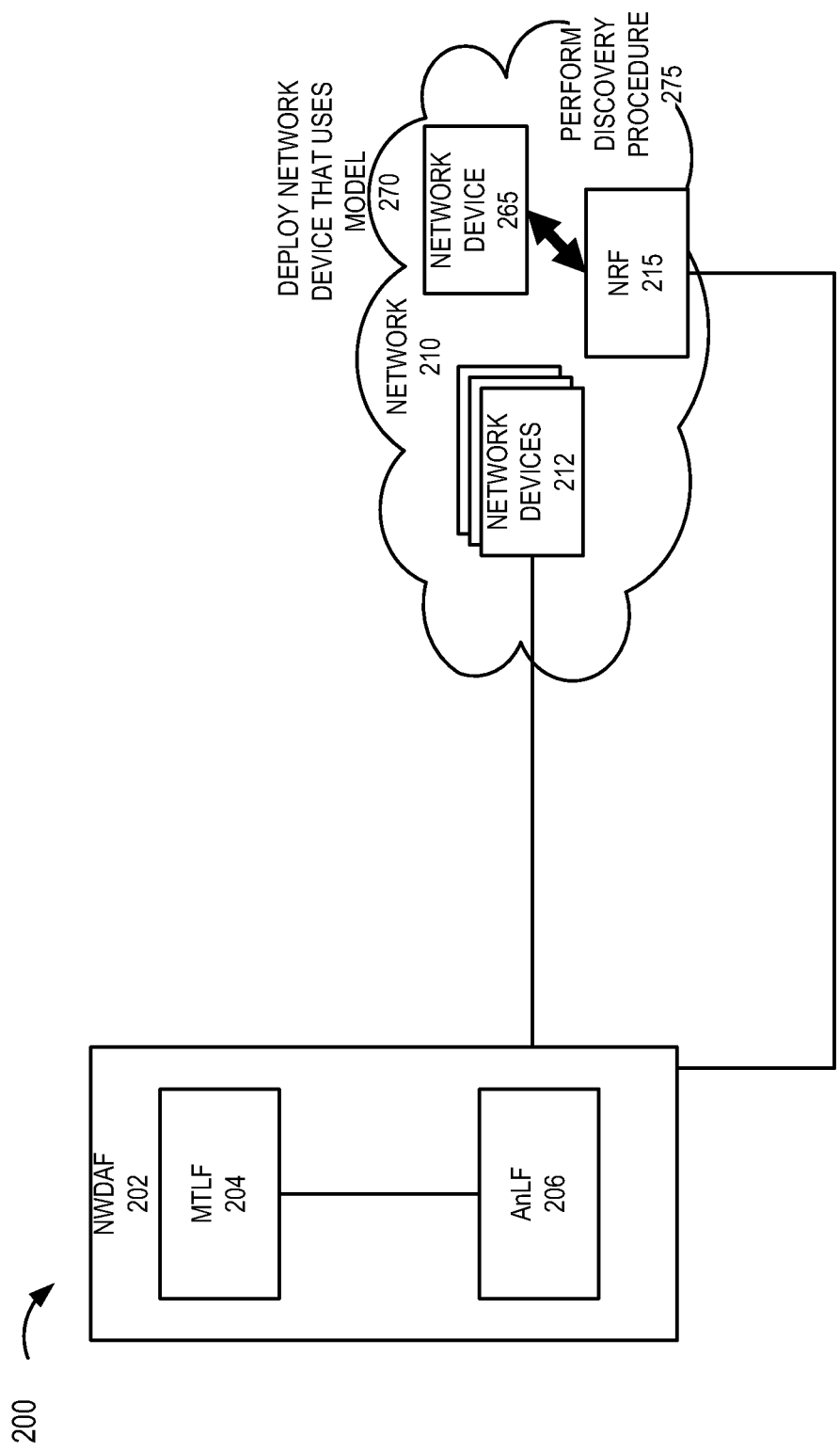

Referring to FIG. 2C, according to an exemplary scenario, assume that an entity deploys 270 a network device (e.g., network device 265) that uses model 220. For example, network device 265 may be configured to use the custom analytics information for tracking fixed wireless devices that are operating outside of their expected cell. For example, the custom analytics information may provide an identifier (e.g., a subscription permanent identifier (SUPI) or another type of globally unique (GU) identifier) for each FWA device of relevance. Additionally, as further illustrated, network device 265 and NRF 215 may perform a discovery procedure 275. For example, network device 265 may query NRF 215 for the custom analytics identifier and/or other custom subscription information relating to model 220 and obtain the custom analytics identifier and other information of relevance to subscribe to the customized analytics information.

Figure 2D:
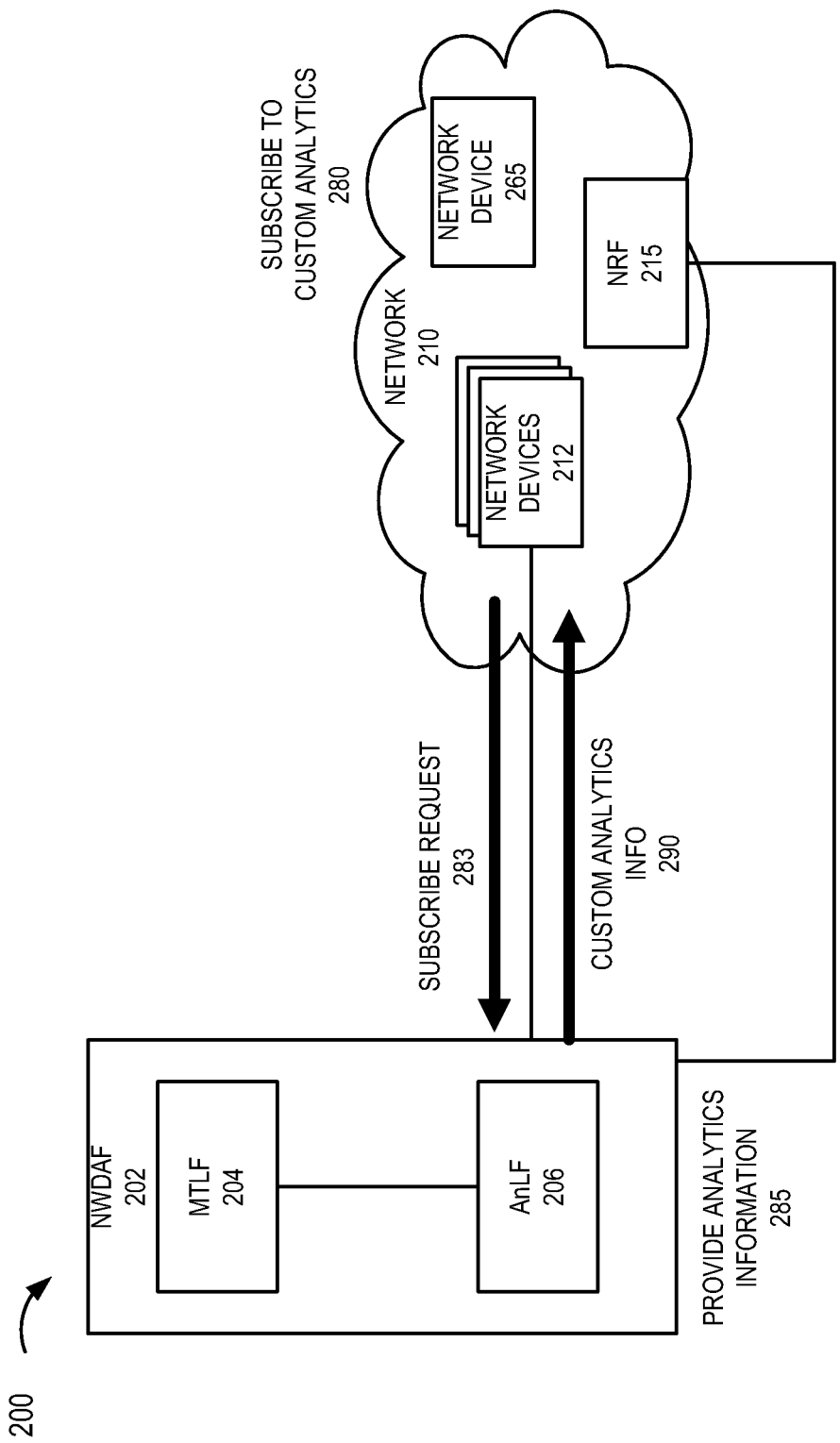

Referring to FIG. 2D, according to an exemplary embodiment, in response to completion of the discovery procedure or another type of triggering event, network device 265 may subscribe to custom analytics 280. For example, network device 265 may generate and transmit a subscribe request 283 to NWDAF 202. Subscribe request 283 may include the custom analytics identifier. In response to receiving subscribe request 283, AnLF 206 of NWDAF 202 may provide analytics information 285. According to an exemplary scenario, NWDAF 202 may collect data as input for model 220. As illustrated, AnLF 206 may generate and transmit custom analytics information 290 to network device 265.

Figure 2E:
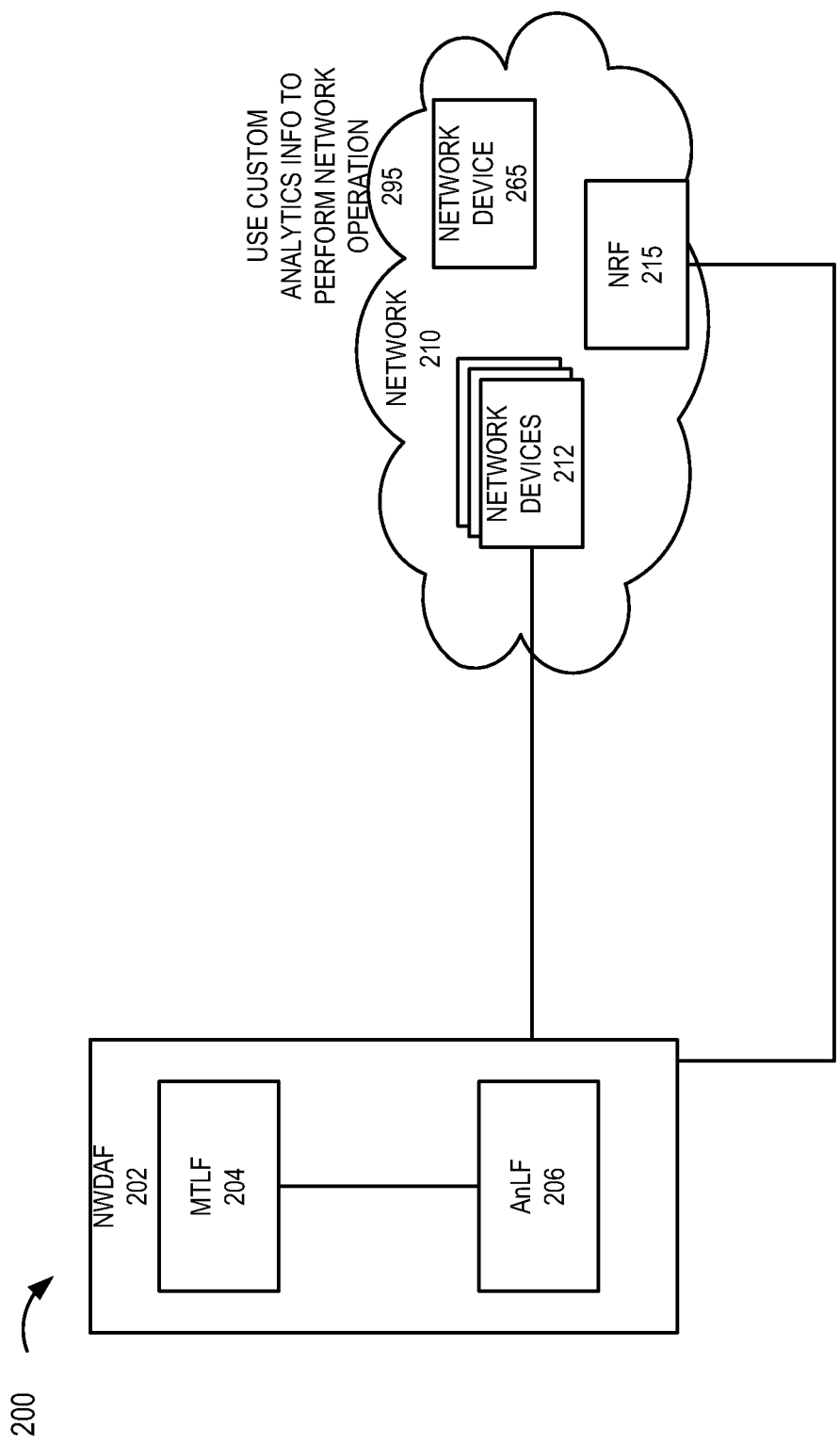

Referring to FIG. 2E, network device 265 may use the custom analytics information to perform a network operation 295. For example, network device 265 may execute a remedial measure that addresses the FWA devices operating outside their expected cells.

FIGS. 2A-2E illustrate and describe an exemplary process of an exemplary embodiment of the network analytics model service, however according to other exemplary embodiments, the network analytics model service may include additional, different and/or fewer operations relative to those described. For example, NWDAF 202 or NRF 215 may invoke a notification procedure when model 220 is provisioned or registered. The notification procedure may notify potential or candidate network devices 212/265 of model 220 and the availability of customized analytics information. The notification procedure may include providing the custom analytics identifier and other data of relevance to enable a subscription procedure from the consumer network device perspective. According to another example, with reference to FIG. 2D, subscriber request 283 and custom analytics information 290 may be communicated via a DCCF and a messaging framework (not illustrated but described).

FIG. 3 is a diagram illustrating exemplary components of a device 300 that may be included in one or more of the devices described herein. For example, device 300 may correspond to access device 107, external device 117, core device 122, end device 130, NWDAF 202, network devices 212, NRF 215, network device 265, and/or other types of devices, as described herein. As illustrated in FIG. 3, device 300 includes a bus 305, a processor 310, a memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, clocks, and so forth.

Processor 310 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc.

Processor 310 may control the overall operation, or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, learning, model-based, etc.

Memory/storage 315 includes one or multiple memories and/or one or multiple other types of storage mediums. For example, memory/storage 315 may include one or multiple types of memories, such as, a random access memory (RAM), a dynamic RAM (DRAM), a static RAM (SRAM), a cache, a read only memory (ROM), a programmable ROM (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 315 may include a hard disk (e.g., a magnetic disk, an optical disk, a magneto-optic disk, a solid-state component, etc.), a Micro-Electromechanical System (MEMS)-based storage medium, and/or a nanotechnology-based storage medium.

Memory/storage 315 may be external to and/or removable from device 300, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 315 may store data, software, and/or instructions related to the operation of device 300.

Software 320 includes an application or a program that provides a function and/or a process. As an example, with reference to NWDAF 202, software 320 may include an application that, when executed by processor 310, provides a function and/or a process of network analytics model service, as described herein. Additionally, with reference to NRF 215, software 320 may include an application that, when executed by processor 310, provides a function and/or a process of network analytics model service, as described herein. Also, with reference to network device 265, software 320 may include an application that, when executed by processor 310, provides a network operation and/or a process that uses customized analytics information obtained via the network analytics model service, as described herein. Software 320 may also include firmware, middleware, microcode, hardware description language (HDL), and/or other form of instruction. Software 320 may also be virtualized. Software 320 may further include an operating system (OS) (e.g., Windows, Linux, Android, proprietary, etc.).

Communication interface 325 permits device 300 to communicate with other devices, networks, systems, and/or the like. Communication interface 325 includes one or multiple wireless interfaces, optical interfaces, and/or wired interfaces. For example, communication interface 325 may include one or multiple transmitters and receivers, or transceivers. Communication interface 325 may operate according to a protocol stack and a communication standard.

Input 330 permits an input into device 300. For example, input 330 may include a keyboard, a mouse, a display, a touchscreen, a touchless screen, a button, a switch, an input port, a joystick, speech recognition logic, and/or some other type of visual, auditory, tactile, affective, olfactory, etc., input component. Output 335 permits an output from device 300. For example, output 335 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, PaaS, etc.). Device 300 may be implemented in the same manner. For example, device 300 may be instantiated, created, deleted, or some other operational state during its life-cycle (e.g., refreshed, paused, suspended, rebooting, or another type of state or status), using well-known virtualization technologies. For example, access device 107, core device 122, external device 117, and/or another type of network device or end device 130, as described herein, may be a virtualized device.

Device 300 may perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a function or a process described herein. Alternatively, for example, according to other implementations, device 300 performs a function or a process described herein based on the execution of hardware (processor 310, etc.).

Figure 4:
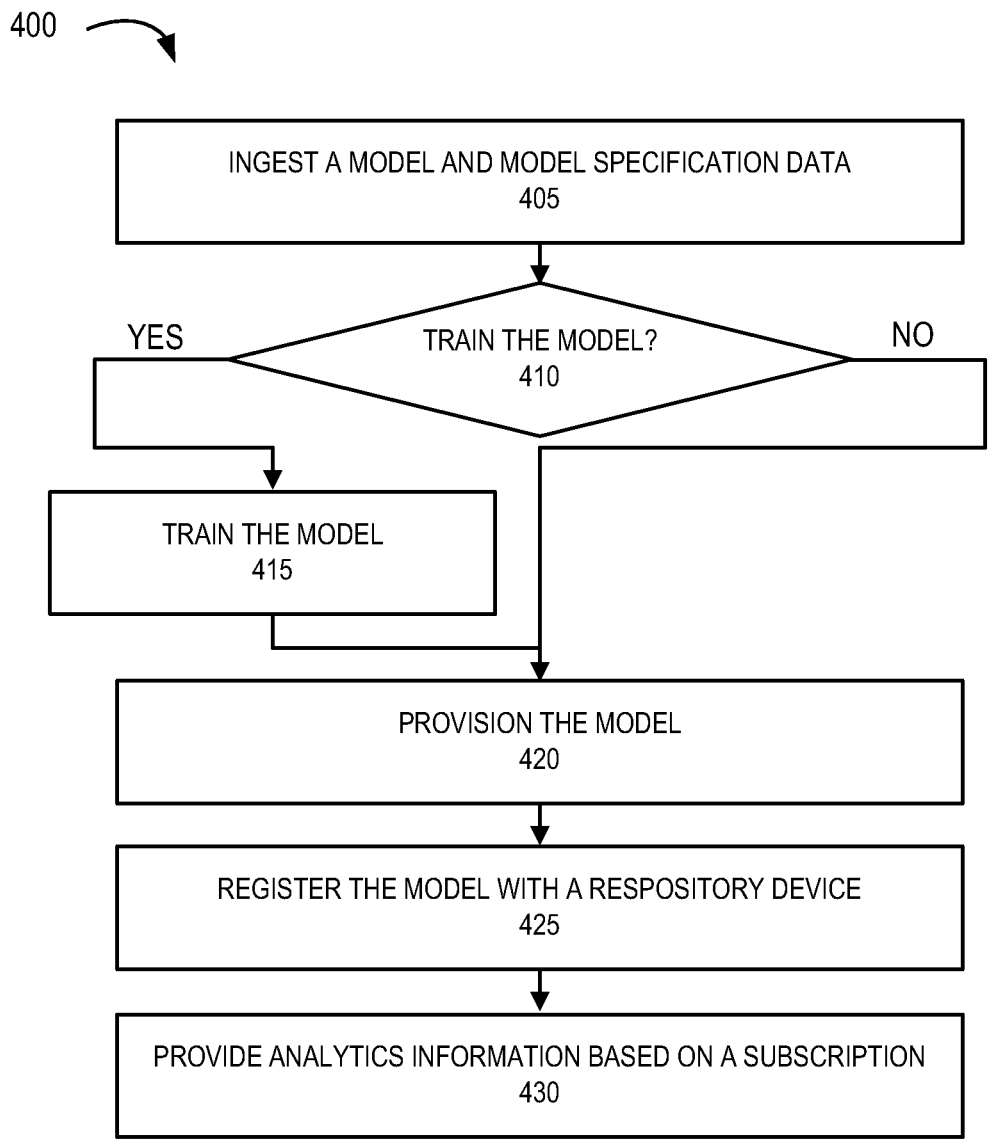
FIG. 4 is a flow diagram illustrating yet another exemplary process of an exemplary embodiment of the network analytics model service.

FIG. 4 is a flow diagram illustrating an exemplary process 400 of an exemplary embodiment of the network analytics model service. According to an exemplary embodiment, NWDAF 202, a similar functioning network device, or a component of NWDAF 202 as described herein (e.g., MTLF 204, AnLF 206, a DCCF, an ADRF, an MFAF, and/or another component of NWDAF) may perform a step of process 400. According to an exemplary implementation, processor 310 executes software 320 to perform the step of process 400, as described herein. For the sake of simplicity, process 400 will be described in relation to NWDAF 202.

In block 405, NWDAF 202 may ingest a model and model specification data. For example, the model may be a custom model, as described herein. Additionally, the model specification data may specify the input and output of the customized model and other types of data, as described herein. The model specification data may indicate a format for a custom analytics identifier relating to the custom model and/or the custom analytics information. NWDAF 202 may store the model and the model specification data.

In block 410, NWDAF 202 may determine whether the model is to be trained or tuned. For example, NWDAF 202 may make this determination based on the model specification data. When it is determined that the model is to be trained (block 410—YES), NWDAF 202 may train the model (block 415). For example, NWDAF 202 may collect data and train/tune the model, as described herein. Alternatively, when it is determined that the model is not to be trained (block 410—NO), NWDAF 202 may provision the model (block 420), as described herein. Similarly, after training the model, NWDAF 202 may provision the model (block 420), as illustrated.

In block 425, NWDAF 202 may register the model with a repository device. For example, NWDAF 202 may register the model with NRF 215. The registration procedure may include providing the custom analytics identifier and other custom subscription information of relevance for prospective consumer network devices to subscribe to the model/custom analytics information. NWDAF 202 may register the model before a subscription request from a consumer network device is received. For example, NWDAF 202 may register the model based on the onboarding procedure or recognition of the analytics identifier as a customized analytics identifier (e.g., based on the format).

In block 430, NWDAF 202 may provide analytics information based on a subscription. For example, NWDAF 202 may provide custom analytics information to consumer network devices (e.g., network device 265) based on their subscription.

FIG. 4 illustrates an exemplary embodiment of a process of the network analytics model service, according to other exemplary embodiments, the network analytics model service may perform additional operations, fewer operations, and/or different operations than those illustrated and described. For example, NWDAF 202 may perform a notification procedure, as described herein, based on the onboarding, provisioning, or registration procedure. According to some exemplary embodiments, the notification procedure may include selecting prospective consumer network devices based on the model specification data of the model. According to yet other exemplary embodiments, at least some of the steps of process 400 may be implemented for models that are not customized.

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks have been described regarding the processes illustrated in FIG. 4, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 310, etc.), or a combination of hardware and software (e.g., software 320).

Embodiments have been described without reference to the specific software code because the software code can be designed to implement the embodiments based on the description herein and commercially available software design environments and/or languages. For example, diverse types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 310) of a device. A non-transitory storage medium includes one or more of the storage mediums described in relation to memory/storage 315. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
   ingesting, by a network device of a Fifth Generation (5G) core network, a customized model and model specification data that includes defining input data and output data, which includes customized analytics information, of the customized model, wherein the customized analytics information is customized relative to analytics information specified by a network standard of the 5G core network;
   provisioning, by the network device in response to the ingesting, the customized model;
   registering, by the network device in response to the provisioning, the customized model with an other network device that enables discovery of the customized analytics information generated by the customized model by one or more subscribing network devices; and
   providing, by the network device after the registering, the customized analytics information of the customized model to the one or more subscribing network devices.

2. The method of claim 1, wherein the registering occurs before receiving a request to subscribe to the customized analytics information from the one or more subscribing network devices.

3. The method of claim 1, further comprising:
   determining, by the network device, whether the customized model is to be trained based on the model specification data; and
   training, by the network device based on determining that the customized model is to be trained, the customized model.

4. The method of claim 1, where the registering comprises:
   registering, by the network device with the other network device, a customized analytics identifier that identifies the customized model and the customized analytics information of the customized model, and wherein a format of the customized analytics identifier is indicated in the model specification data.

5. The method of claim 1, further comprising:
   notifying, by the network device before receiving a request to subscribe to the customized analytics information from the one or more subscribing network devices, the one or more subscribing network devices of the registering.

6. The method of claim 1, wherein the model specification data includes data indicating at least one of a type of network slice of relevance or a type of prospective subscribing network device of relevance to the customized analytics information of the customized model.

7. The method of claim 1, wherein the customized analytics information does not include analytic information pertaining to slice load information, observed service experience information, network function load information, network performance information, user equipment (UE) mobility information, UE communication information, expected UE behavioral parameters, UE abnormal behavior information, user data congestion information, and/or quality of service (QOS) sustainability.

8. The method of claim 1, wherein the network device is a network analytics data function (NWDAF).

9. A network device comprising:
   a processor configured to:
      ingest a customized model and model specification data that includes defining input data and output data, which includes customized analytics information, of the customized model, wherein the network device is included in a Fifth Generation (5G) core network, and the customized analytics information is customized relative to analytics information specified by a network standard of the 5G core network;
      provision, in response to an ingestion, the customized model;
      register, in response to a provision, the customized model with an other network device that enables discovery of the customized analytics information generated by the customized model by one or more subscribing network devices; and
      provide, after a registration, the customized analytics information of the customized model to the one or more subscribing network devices.

10. The network device of claim 9, wherein, wherein registering, the processor is further configured to:
    register the customized model before receiving a request to subscribe to the customized analytics information from the one or more subscribing network devices.

11. The network device of claim 9, wherein the processor is further configured to:
    determine whether the customized model is to be trained based on the model specification data; and
    train, based on the determination that the customized model is to be trained, the customized model.

12. The network device of claim 9, wherein, when registering, the processor is further configured to:
    register, with the other network device, a customized analytics identifier that identifies the customized model and the customized analytics information of the customized model, and wherein a format of the customized analytics identifier is indicated in the model specification data.

13. The network device of claim 9, wherein the processor is further configured to:
    notify, before receiving a request to subscribe to the customized analytics information from the one or more subscribing network devices, the one or more subscribing network devices of the registering.

14. The network device of claim 9, wherein the customized analytics information does not include analytics information pertaining to slice load information, observed service experience information, network function load information, network performance information, user equipment (UE) mobility information, UE communication information, expected UE behavioral parameters, UE abnormal behavior information, user data congestion information, and/or quality of service (QOS) sustainability.

15. The network device of claim 9, wherein the model specification data includes data indicating at least one of a type of network slice of relevance or a type of prospective subscribing network device of relevance to the customized analytics information of the customized model.

16. The network device of claim 9, wherein the network device is a network analytics data function (NWDAF).

17. A non-transitory computer-readable storage medium storing instructions executable by a processor of a network device of a Fifth Generation (5G) core network, wherein the instructions are configured to:

ingest a customized model and model specification data that includes defining input data and output data, which includes customized analytics information, of the customized model, wherein the customized analytics information is customized relative to analytics information specified by a network standard of the 5G core network;

provision, in response to an ingestion, the customized model;

register, in response to a provision, the customized model with an other network device that enables discovery of the customized analytics information generated by the customized model by one or more subscribing network devices; and provide, after a registration, the customized analytics information of the customized model to the one or more subscribing network devices.

18. The non-transitory computer-readable storage medium of claim 17, wherein the instructions are further configured to:

register the customized model before receiving a request to subscribe to the customized analytics information.

19. The non-transitory computer-readable storage medium of claim 17, wherein the instructions are further configured to:

register, with the other network device, a customized analytics identifier that identifies the customized model and the customized analytics information of the customized model, and wherein a format of the customized analytics identifier is indicated in the model specification data.

20. The non-transitory computer-readable storage medium of claim 17, wherein the instructions are further configured to:

notify, before receiving a request to subscribe to the customized analytics information from the one or more subscribing network devices, the one or more subscribing network devices of the registering.

* * * * *